US011736149B2

(12) United States Patent
Lu et al.

(10) Patent No.: US 11,736,149 B2
(45) Date of Patent: Aug. 22, 2023

(54) DATA TRANSMISSION METHOD FOR BLUETOOTH CARD READER AND ELECTRONIC DEVICE

(71) Applicant: FEITIAN TECHNOLOGIES CO., LTD., Beijing (CN)

(72) Inventors: Zhou Lu, Beijing (CN); Huazhang Yu, Beijing (CN)

(73) Assignee: FEITIAN TECHNOLOGIES CO., LTD., Beijing (CN)

(*) Notice: Subject to any disclaimer, the term of this patent is extended or adjusted under 35 U.S.C. 154(b) by 158 days.

(21) Appl. No.: 17/397,906

(22) Filed: Aug. 9, 2021

(65) Prior Publication Data
US 2021/0367643 A1 Nov. 25, 2021

Related U.S. Application Data

(63) Continuation of application No. PCT/CN2019/127549, filed on Dec. 23, 2019.

(30) Foreign Application Priority Data

Jun. 28, 2019 (CN) .......................... 201910573638.7

(51) Int. Cl.
*H04B 5/00* (2006.01)
*G06K 17/00* (2006.01)
*H04W 4/80* (2018.01)
(52) U.S. Cl.
CPC ....... *H04B 5/0056* (2013.01); *G06K 17/0029* (2013.01); *H04B 5/0031* (2013.01); *H04W 4/80* (2018.02)
(58) Field of Classification Search
CPC ..... H04B 5/0056; H04B 5/0031; H04W 4/80; G06K 17/0029; G06K 7/10297
(Continued)

(56) References Cited

U.S. PATENT DOCUMENTS

2005/0185463 A1 8/2005 Kanamori
2008/0014867 A1* 1/2008 Finn ..................... G06K 7/0008
455/41.1
(Continued)

FOREIGN PATENT DOCUMENTS

CN 101876951 A 11/2010
CN 102222208 A 10/2011
(Continued)

OTHER PUBLICATIONS

International Search Report PCT/CN2019/127549.
(Continued)

*Primary Examiner* — Eugene Yun
(74) *Attorney, Agent, or Firm* — J.C. Patents

(57) ABSTRACT

The present application relates to a data transmission method for a Bluetooth card reader and an electronic device. The method includes: a CCID driver determines communication rate information corresponding to the Bluetooth card reader based on type information corresponding to the Bluetooth card reader; the CCID driver determines specific communication rate information based on card information and the communication rate information; the CCID driver carries the specific communication rate information in a communication rate confirming request and forwards, via the Bluetooth service program, the communication rate confirming request to the Bluetooth card reader for verification, where the Bluetooth card reader is connected with the Bluetooth service program via Bluetooth; and the CCID driver instructs, based on a communication rate acknowledgement response returned by the Bluetooth card reader, the Bluetooth card reader to transmit, with the specific communication rate information confirmed through the communication rate acknowledgement response, data to be transmitted.

12 Claims, 5 Drawing Sheets

(58) Field of Classification Search
USPC .......................................................... 455/41.1
See application file for complete search history.

(56) References Cited

U.S. PATENT DOCUMENTS

| 2011/0179290 A1* | 7/2011 | Adams | G07F 7/00 |
| | | | 713/193 |
| 2012/0185622 A1 | 7/2012 | Capomaggio | |
| 2014/0089119 A1 | 3/2014 | Fahn | |

FOREIGN PATENT DOCUMENTS

| CN | 103310175 A | 9/2013 |
| CN | 104156761 A | 11/2014 |
| CN | 105005540 A | 10/2015 |
| CN | 105162498 A | 12/2015 |
| CN | 105354160 A | 2/2016 |
| CN | 105701057 A | 6/2016 |
| CN | 106686535 A | 5/2017 |
| CN | 106886734 A | 6/2017 |
| CN | 107784243 A | 3/2018 |
| CN | 107819543 A | 3/2018 |
| CN | 108494681 A | 9/2018 |
| CN | 110336592 A | 10/2019 |
| WO | WO2011119302 A1 | 9/2011 |

OTHER PUBLICATIONS

First Office Action of the priority CN application.
NPL1: "Research and Realization of Multifunctional Smart Card Readers Based on CCID", Author: Zhang, Bei Publisher: China Outstanding Master's Degree Thesis Full Text Database, Information Science and Technology Series Date: May 30, 2013.
NPL2: "The Design and Implementation of Bluetooth Card Reader based on Security SOC chip", Author: Bi, Jingxu Publisher: China Outstanding Master's Degree Thesis Full Text Database, Information Science and Technology Series Date: May 26, 2016.
Notice of Allowance of the priority CN application.

* cited by examiner

DATA TRANSMISSION METHOD FOR BLUETOOTH CARD READER AND ELECTRONIC DEVICE

CROSS-REFERENCE TO RELATED APPLICATIONS

This application is a continuation of the International Application No. PCT/CN2019/127549, filed on Dec. 23, 2019, which claims priority to Chinese Patent Application No. 201910573638.7, filed on Jun. 28, 2019, both of the aforementioned applications are hereby incorporated by reference in their entireties.

TECHNICAL FIELD

The disclosure relates to the field of communication technology, more particularly, to a data transmission method for a Bluetooth card reader and an electronic device.

BACKGROUND

With fast development of electronic information science, for existing operating system (such as MAC OS, Linux system and Windows system etc.), data communication based on USB function can only be performed with a Bluetooth card reader via the USB driver on the existing operating system. However, data communication based on USB function is limited by its physical connecting manner plugged in through the interface, and certain transmission limitations. Therefore, how to avoid the transmission limitation problem caused by the existing transmission manner when performing data communication between the operating system and the Bluetooth card reader has become a technical problem that needs to be solved urgently.

SUMMARY

The present application provides a data transmission method for a Bluetooth card reader and an electronic device to avoid the limitations of the existing transmission manners, expand application scenarios of the data transmission, and enhance the selection and development of the data transmission.

In a first aspect, a data transmission method for a Bluetooth card reader is provided, which includes the following steps:

sending, by a chip/smart card interface device (CCID) driver, a first request message for obtaining type information corresponding to a Bluetooth card reader to a Bluetooth service program;

receiving, by the CCID driver, a first response message returned by the Bluetooth service program;

in a case that the first response message carries the type information corresponding to the Bluetooth card reader, determining, by the CCID driver, communication rate information corresponding to the Bluetooth card reader based on the type information corresponding to the Bluetooth card reader;

obtaining, by the CCID driver, state information of a card slot of the Bluetooth card reader, where the state information carries card information of a card inserted in the card slot of the Bluetooth card reader;

determining, by the CCID driver, a specific communication rate information for data transmission based on the card information and the communication rate information;

carrying, by the CCID driver, the specific communication rate information in a communication rate confirming request and forwarding, via the Bluetooth service program, the communication rate confirming request to the Bluetooth card reader for verification, wherein the Bluetooth card reader is connected with the Bluetooth service program via Bluetooth; and instructing, by the CCID driver, based on a communication rate acknowledgement response returned by the Bluetooth card reader, the Bluetooth card reader to transmit, with the specific communication rate information confirmed through the communication rate acknowledgement response, data to be transmitted.

In a possible implementation manner, before the sending, by the CCID driver, the first request message for obtaining type information corresponding to the Bluetooth card reader to the Bluetooth service program, the method further includes:

confirming, by the CCID driver, whether a connection with the Bluetooth service program has been established; and if no, establishing, by the CCID driver, the connection with the Bluetooth service program, and sending the first request message to the Bluetooth service program after the connection has been established.

In a possible implementation manner, the determining, by the CCID driver, the communication rate information corresponding to the Bluetooth card reader based on the type information corresponding to the Bluetooth card reader includes:

querying, by the CCID driver, based on the type information corresponding to the Bluetooth card reader, and determining, descriptor information corresponding to the type of the Bluetooth card reader; and obtaining, by the CCID driver, the communication rate information corresponding to the Bluetooth card reader based on the descriptor information.

In a possible implementation manner, the obtaining, by the CCID driver, the state information of the card slot of the Bluetooth card reader includes:

sending, by the CCID driver, a second request message for obtaining the state information of the card slot of the Bluetooth card reader to the Bluetooth service program; and receiving, by the CCID driver, a second response message sent from the Bluetooth service program, where the second response message carries the card information of the card inserted in the card slot of the Bluetooth card reader.

In a possible implementation manner, the determining, by the CCID driver, the specific communication rate information for data transmission based on the card information and the communication rate information includes:

obtaining, by the CCID driver, card rate information corresponding to the card carried in the card information; and when the number of the communication rate information is at least two, screening, by the CCID driver, based on the card rate information, selecting communication rate information with a maximum rate value from respective communication rate information corresponding to which a rate value is not greater than a rate value corresponding to the communication rate information, and determining the selected communication rate information as the specific communication rate information.

In a possible implementation manner, the instructing, by the CCID driver, based on the communication rate acknowledgement response returned by the Bluetooth card reader, the Bluetooth card reader to transmit, with the specific communication rate information confirmed through the communication rate acknowledgement response, the data to be transmitted includes:

sending, by the CCID driver, a data transmission instruction carrying the data to be transmitted and the specified communication rate to the Bluetooth card reader and instructing the Bluetooth card reader to transmit the data to be transmitted based on the specified communication rate.

In a second aspect, a data transmission apparatus for a Bluetooth card reader is provided; the data transmission apparatus includes:

a sending unit, configured to send a first request message for obtaining type information corresponding to a Bluetooth card reader to a Bluetooth service program;

a receiving unit, configured to receive a first response message returned by the Bluetooth service program;

a first processing unit, configured to determine a communication rate information corresponding to the Bluetooth card reader based on type information corresponding to the Bluetooth card reader in a case that the first response message carries the type information corresponding to the Bluetooth card reader;

an obtaining unit, configured to obtain state information of a card slot of the Bluetooth card reader, where the state information carries card information of a card inserted in the card slot of the Bluetooth card reader;

the first processing unit is further configured to determine a specific communication rate information for data transmission based on the card information and the communication rate information;

the sending unit is further configured to carry the specific communication rate information in a communication rate confirming request and forward, via the Bluetooth service program, the communication rate confirming request to the Bluetooth card reader for verification, wherein the Bluetooth card reader is connected with the Bluetooth service program via Bluetooth; and a second processing unit, configured to, instruct, based on a communication rate acknowledgement response returned by the Bluetooth card reader, the Bluetooth card reader to transmit, with the specific communication rate information confirmed through the communication rate acknowledgement response, data to be transmitted.

In a possible implementation manner, the apparatus further includes:

a third processing unit, configured to confirm whether a connection with the Bluetooth service program has been established; if no, establish the connection with the Bluetooth service program, and send the first request message to the Bluetooth service program after the connection has been established.

In a possible implementation manner, the first processing unit is configured to query, based on the type information corresponding to the Bluetooth card reader and determine descriptor information corresponding to the type of the Bluetooth card reader, and obtain the communication rate information corresponding to the Bluetooth card reader based on the descriptor information.

In a possible implementation manner, the obtaining unit is configured to send a second request message for obtaining the state information of the card slot of the Bluetooth card reader to the Bluetooth service program, and receive a second response message sent from the Bluetooth service program, where the second response message carries the state information indicating that a card is in the card slot of the Bluetooth card reader and the card information corresponding to the card.

In a possible implementation manner, the first processing unit is specifically configured to obtain card rate information corresponding to the card carried in the card information; when the number of communication rate information is at least two, screen, based on the card rate information, select communication rate information with a maximum rate value from respective communication rate information corresponding to which a rate value is not greater than a rate value corresponding to the communication rate information, and determine the selected communication rate information as the specific communication rate information.

In a possible implementation manner, the second processing unit is configured to send a data transmission instruction carrying the data to be transmitted and the specified communication rate to the Bluetooth card reader and instruct the Bluetooth card reader to transmit the data to be transmitted based on the specified communication rate.

In a third aspect, an electronic device is provided; the electronic device includes a processor and a memory;

the memory is configured to store operation instructions;

the processor is configured to execute the data transmission method for a Bluetooth card reader by calling the operation instructions.

In a fourth aspect, a computer-readable storage medium is provided; the computer readable storage medium is configured to store computer instructions; when the computer instructions are executed on a computer, enables the computer to execute the above data transmission method for Bluetooth card reader.

With the above technical solution, the technical solution provided by the present application has at least the following advantages:

In the present application, through the cooperation of the CCID driver, the Bluetooth service program and the Bluetooth card reader, the effective selection of data transmission is realized, the application scenarios of data transmission are expanded, and the selection and development of data transmission are promoted.

BRIEF DESCRIPTION OF DRAWINGS

By reading the detailed description of the preferred embodiments below, various other advantages and benefits will become clear to those of ordinary skill in the art. The drawings are only used for the purpose of illustrating the preferred embodiments, and are not considered as a limitation to the embodiments of the present application. And throughout the drawings, the same reference signs are used to denote the same parts. In the drawings.

DESCRIPTION OF EMBODIMENTS

The application provides a data transmission method for a Bluetooth card reader and an electronic device, the specific implementation of the present application will be described in detail below with reference to the drawings.

The embodiments of the application will be further described in details as below. Examples of the embodiments are shown in drawings, in which same or similar reference numbers always represent same or similar elements or elements with same or similar functions. The embodiments described with reference to the drawings are exemplary, just used for explaining the application, not for limiting the application.

An ordinary person skilled in the art may understand that "a", "an", "said" and "this" may also refer to plural nouns, unless otherwise specifically stated. It should be further understood that, phraseology "include" used in the specification of the application refers to the presence of the characteristics, integers, steps, operations, elements and/or components, but not exclusive of the presence or addition of one or more other characters, integers, steps, operations, elements, components and/or groups thereof. It should be understood that when we mention that an element is "connected" or "coupled" to another element, it may be directly connected or coupled to the other elements, or intermediate elements may be available. In addition, "connection" or "coupling" used herein may include wireless connection or coupling. The phraseology "and/or" includes any one unit and all combinations of one or more associated listed items.

Unless otherwise defined, all terms (including technical and scientific terms) used herein have the same meaning as commonly understood by one of ordinary skill in the art to which the present application belongs. It shall be further understood that terms, such as those defined in commonly used dictionaries, should be interpreted as having a meaning that is consistent with their meaning in the context of the relevant art and will not be interpreted in an idealized or overly formal sense unless expressly so defined herein.

In order to make the objectives, technical solutions, and advantages of the present application clearer, the implementation manners of the present application will be further described in detail below in conjunction with the accompanying drawings. The following specific embodiments may be combined, and same or similar concepts or processes may not be repeated in some embodiments.

Figure 1:
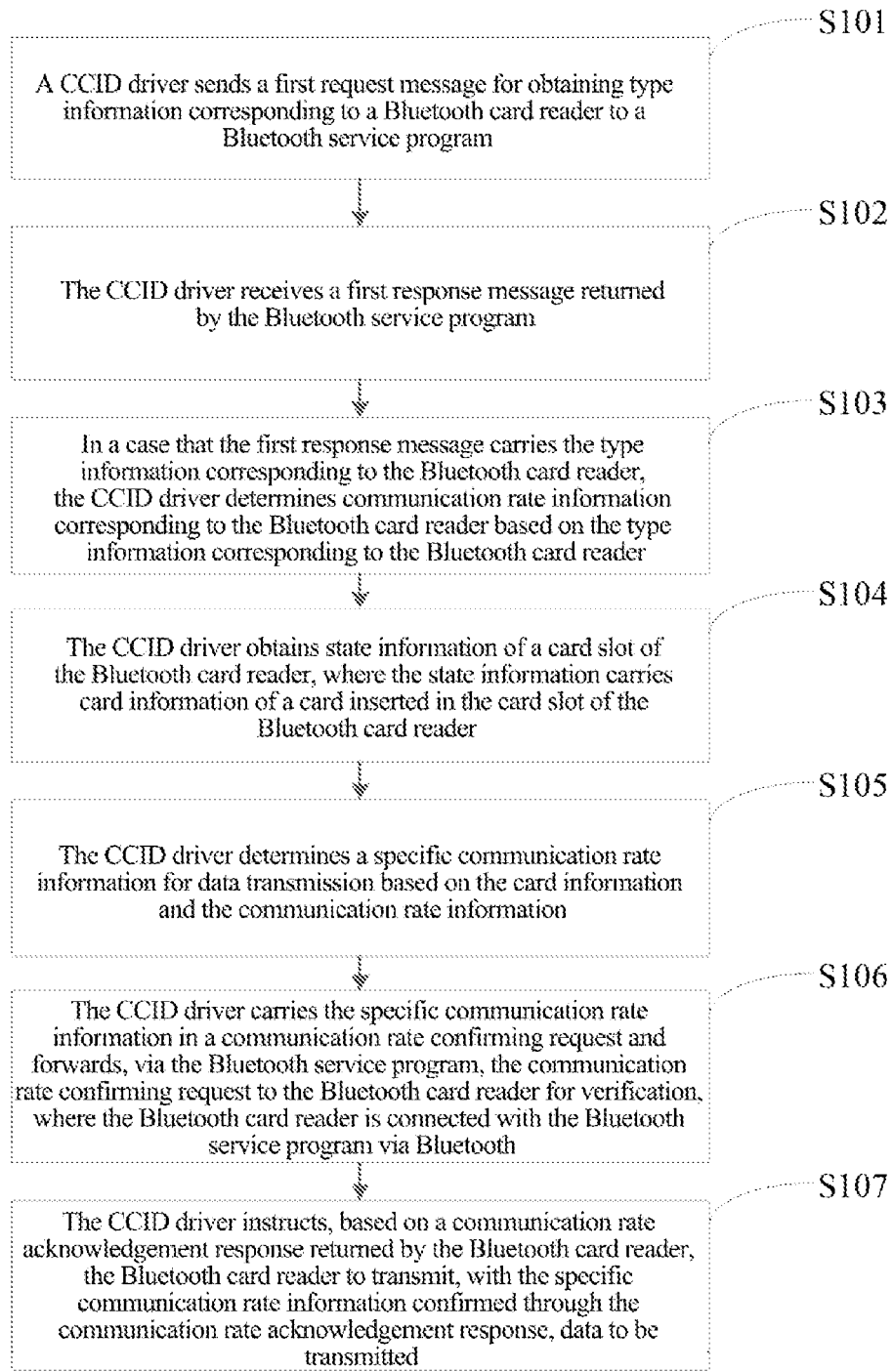
FIG. 1 is a flowchart of a data transmission method for a Bluetooth card reader provided by the present application.

FIG. 1 is a flowchart of a data transmission method provided by the present application. As shown in FIG. 1, the method includes the following steps:

Step S101, a Chip/Smart Card Interface Device (CCID) driver sends a first request message for obtaining type information corresponding to a Bluetooth card reader to a Bluetooth service program;

Step S102, the CCID driver receives a first response message returned by the Bluetooth service program;

Step S103, in a case that the first response message carries the type information corresponding to the Bluetooth card reader, the CCID driver determines communication rate information corresponding to the Bluetooth card reader based on the type information corresponding to the Bluetooth card reader;

Step S104, the CCID driver obtains state information of a card slot of the Bluetooth card reader, where the state information carries card information of a card inserted in the card slot of the Bluetooth card reader;

Step S105, the CCID driver determines a specific communication rate information for data transmission based on the card information and the communication rate information;

Step S106, the CCID driver carries the specific communication rate information in a communication rate confirming request and forwards, via the Bluetooth service program, the communication rate confirming request to the Bluetooth card reader for verification, where the Bluetooth card reader is connected with the Bluetooth service program via Bluetooth;

Step S107, the CCID driver instructs, based on a communication rate acknowledgement response returned by the Bluetooth card reader, the Bluetooth card reader to transmit, with the specific communication rate information confirmed through the communication rate acknowledgement response, data to be transmitted.

In the present application, through the cooperation of the CCID driver, the Bluetooth service program and the Bluetooth card reader, the effective selection of data transmission is realized, the application scenarios of data transmission are expanded, and the selection and development of data transmission are promoted.

Figure 2:
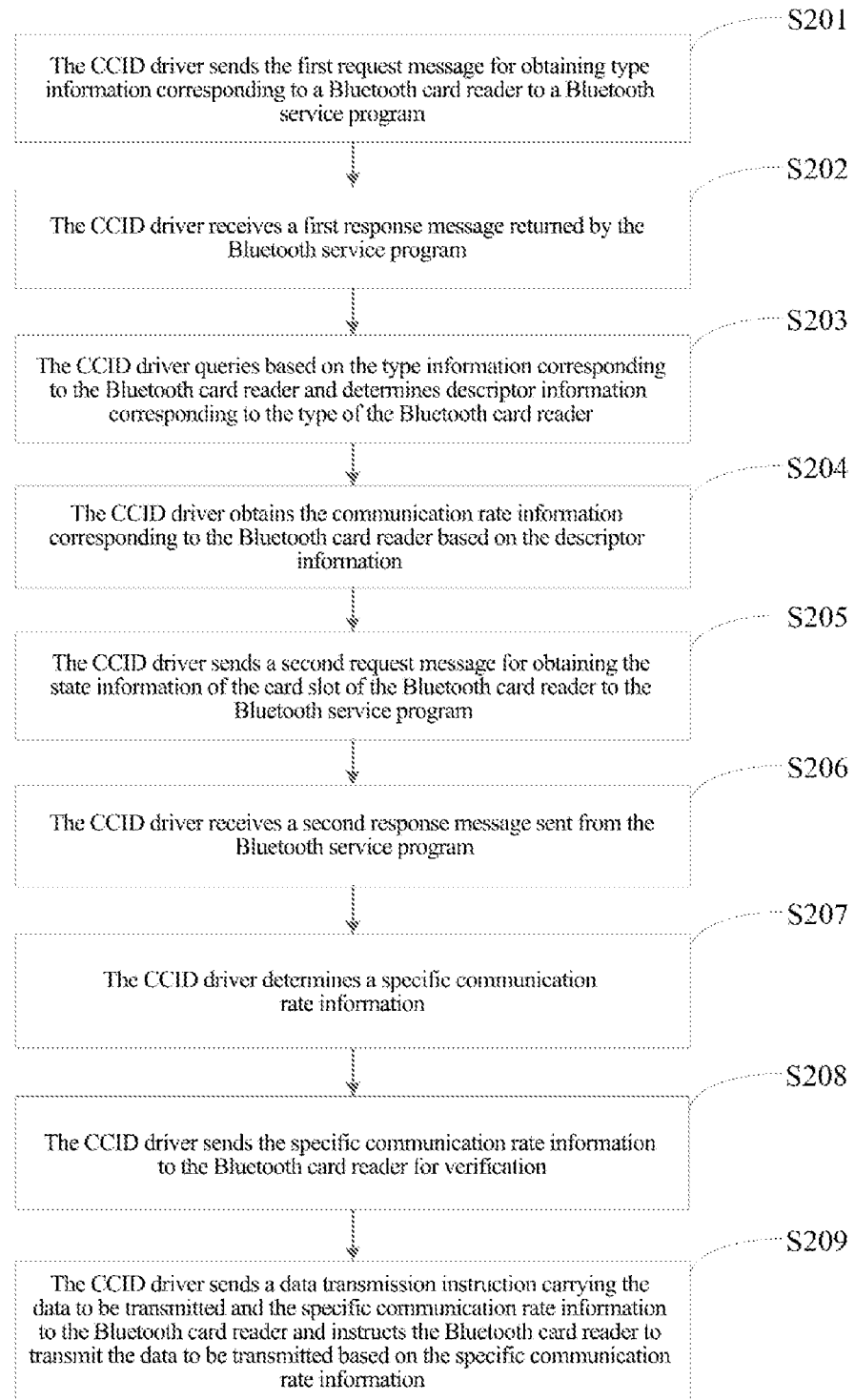
FIG. 2 is a specific processing flowchart of a possible implementation manner of a data transmission method for a Bluetooth card reader provided by the present application.

Based on the technical solution provided by the present application, details about the technical solution is given hereafter. FIG. 2 is a specific processing flowchart of a possible implementation manner of data transmission method provided by the present application. In the present technical solution, the CCID driver connects to the Bluetooth service program via network, the Bluetooth service program connects with the Bluetooth card reader via Bluetooth.

For the present application, in a possible implementation manner, the processing of the aforementioned step S101 specifically includes the processing of the following step S201.

Step 201, the CCID driver sends the first request message for obtaining type information corresponding to a Bluetooth card reader to a Bluetooth service program.

In a possible implementation manner, after receiving the aforementioned first request message, the Bluetooth service program forwards the first request message to a corresponding Bluetooth card reader according to the first request message so as to request to obtain the type information corresponding to the Bluetooth card reader.

In a possible implementation manner, before the present step, after the system is powered on, the system will load the CCID driver in advance; and after the loading, attempt to activate the Bluetooth card reader; because having not been established a connection with the Bluetooth service program at this time, the CCID driver will push itself a fake notification message indicating that the Bluetooth card reader has activated; and the push of the above notification message also enables the CCID driver to maintain the current background online state. Further, the CCID driver needs to confirm whether it is connected to the Bluetooth service program, if not, the CCID driver needs to establish a corresponding connection with the Bluetooth service program, and send a request for obtaining type information corresponding to a Bluetooth card reader to a Bluetooth service program after the connection is successfully established; if yes, the processing goes directly to Step S205.

Among them, in order to prevent the CCID driver from stopping the program due to not working in the system, the CCID driver will periodically push itself a fake notification message indicating that the Bluetooth card reader has been activated, so that the CCID driver remains online in the background of the system.

Among them, the Bluetooth service program and the Bluetooth card reader are connected via Bluetooth, and the Bluetooth connection between the Bluetooth service program and the Bluetooth card reader is initiated by the Bluetooth service program to the Bluetooth card reader.

For the present application, in a possible implementation manner, the processing of the aforementioned Step S102 to the Step S103 specifically includes the processing of the following Step S202 to Step S204.

Step S202, the CCID driver receives a first response message returned by the Bluetooth service program.

In a possible implementation manner, the response message is a response message sent by the Bluetooth card reader to the request message for obtaining type information corresponding to the Bluetooth card reader and the response message will carry type information corresponding to the Bluetooth card reader.

Step S203, the CCID driver queries based on the type information corresponding to the Bluetooth card reader and determines descriptor information corresponding to the type of the Bluetooth card reader.

In a possible implementation manner, after the obtaining the type information of the Bluetooth card reader, the CCID driver will query its own database according to the type information, and find the descriptor information corresponding to the type information.

Step S204, the CCID driver obtains the communication rate information corresponding to the Bluetooth card reader based on the descriptor information.

In a possible implementation manner, at least one communication rate information corresponding to the Bluetooth card reader will be stored in the descriptor information corresponding to each Bluetooth card reader.

For the present disclosure, in a possible implementation manner, the processing of the aforementioned Step S104 includes the processing of the following Step S205 to Step S206.

Step S205, the CCID driver sends a second request message for obtaining the state information of the card slot of the Bluetooth card reader to the Bluetooth service program;

Step S206, the CCID driver receives a second response message sent from the Bluetooth service program.

Among them, the second response message carries the state information indicating that a card is in the card slot of the Bluetooth card reader and the card information corresponding to the card. The card information may include card rate information corresponding to the card.

For the present disclosure, in a possible implementation manner, the processing of the aforementioned Step S105 to Step S106 specifically includes the processing of the following Step S207 to Step S208.

Step S207, the CCID driver determines a specific communication rate information.

For the present application, when the number of the communication rate information is at least two, the CCID driver screens based on the card rate information, selects communication rate information with a maximum rate value from respective communication rate information corresponding to which a rate value is not greater than a rate value corresponding to the communication rate information, and determines the selected communication rate information as a specific communication rate information.

In a possible implementation manner, when the communication rate information is one, the CCID driver will directly instruct the Bluetooth card reader to use the communication rate information for transmission during sending instructions to the Bluetooth card reader in the future.

Step S208, the CCID driver sends the specific communication rate information to the Bluetooth card reader for verification.

Specifically, the CCID driver carries the selected specific communication rate information in the communication rate confirming request, and sends the communication rate confirming request to the Bluetooth card reader via the Bluetooth service program, so that the Bluetooth card reader determines whether to permit the CCID driver to perform data transmission with the selected specific communication rate information; the Bluetooth card reader sends a data transmission response to the CCID driver via the Bluetooth service program, when the data transmission response is the communication rate acknowledgement response (that is, a confirming information permitting data transmission with the selected specific communication rate information), and then the CCID driver can instruct the Bluetooth card reader to perform data transmission with the specific communication rate information; when the data transmission response is the data transmission non-acknowledgement response (that is, the selected communication rate information is not permitted to be used for data transmission), the CCID driver will select a communication rate information from the remaining communication rate information and send the selected communication rate information to the Bluetooth card reader for verification and confirmation till the CCID driver receives an acknowledgement information that the selected communication rate information is permitted to be used for data transmission from the Bluetooth card reader.

For the present application, in a possible implementation manner, the processing of Step S107 may specifically include the processing of the following Step S209.

Step S209, the CCID driver sends a data transmission instruction carrying the data to be transmitted and the specific communication rate information to the Bluetooth card reader and instructs the Bluetooth card reader to transmit the data to be transmitted based on the specific communication rate information.

In a possible implementation manner, the CCID driver sends the data transmission instruction carrying the data to be transmitted and the specific communication rate information to the Bluetooth service program, forwards the data transmission instruction to the Bluetooth card reader via the Bluetooth service program; the Bluetooth card reader transmits the data to be transmitted with the specific communication rate information after receiving the aforementioned data transmission instruction.

In the present application, through the cooperation of the CCID driver, the Bluetooth service program and the Bluetooth card reader, the effective selection of data transmission is realized, the application scenarios of data transmission are expanded, and the selection and development of data transmission are promoted.

Figure 3:
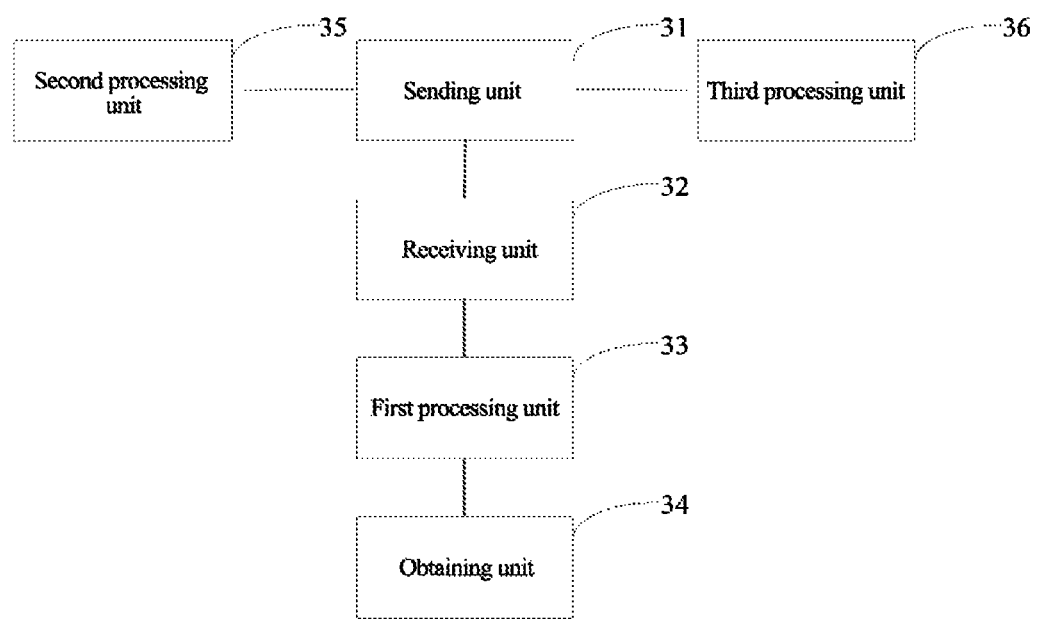
FIG. 3 is a structural diagram of a data transmission apparatus for a Bluetooth card reader provided by the present application.

Based on the technical solution for the data transmission method provided by the present application, correspondingly, the present application provides a structural diagram of a data transmission apparatus for a Bluetooth card reader. As shown by FIG. 3, the data transmission apparatus 30 of the present application may include a sending unit 31, a receiving unit 32, a first processing unit 33, an obtaining unit 34, a second processing unit 35 and a third processing unit 36;

the sending unit 31 is configured to send a first request message for obtaining type information corresponding to a Bluetooth card reader to a Bluetooth service program;

the receiving unit 32 is configured to receive a first response message returned by the Bluetooth service program;

the first processing unit 33 is configured to determine a communication rate information corresponding to the Bluetooth card reader based on type information corresponding to the Bluetooth card reader in a case that the first response message carries the type information corresponding to the Bluetooth card reader;

the obtaining unit 34 is configured to obtain state information of card slot of the Bluetooth card reader, where the state information carries card information of a card inserted in the card slot of the Bluetooth card reader;

the first processing unit 33 is further configured to determine a specific communication rate information for data transmission based on the card information and the communication rate information;

the sending unit 31 is further configured to carry the specific communication rate information in a communication rate confirming request and forward, via the Bluetooth service program, the communication rate confirming request to the Bluetooth card reader for verification, wherein the Bluetooth card reader is connected with the Bluetooth service program via Bluetooth;

the second processing unit 35 is configured to, instruct, based on a communication rate acknowledgement response returned by the Bluetooth card reader, the Bluetooth card reader to transmit, with the specific communication rate information confirmed through the communication rate acknowledgement response, data to be transmitted.

In a possible implementation manner, the apparatus further includes:

a third processing unit 36, configured to determine whether a connection with the Bluetooth service program has been established; if no, establish the connection with the Bluetooth service program, and send the first request message to the Bluetooth service program after the connection has been established.

In a possible implementation manner, the first processing unit 33 is configured to query, based on the type information corresponding to the Bluetooth card reader and determine descriptor information corresponding to the type of the Bluetooth card reader, and obtain the communication rate information corresponding to the Bluetooth card reader based on the descriptor information.

In a possible implementation manner, the obtaining unit 34 is configured to send a second request message for obtaining the state information of the card slot of the Bluetooth card reader to the Bluetooth service program; and receive a second response message sent from the Bluetooth service program, where the second response message carries the state information indicating that a card is in the card slot of the Bluetooth card reader and the card information corresponding to the card.

In a possible implementation manner, the first processing unit 33 is specifically configured to obtain card rate information corresponding to the card carried in the card information; when the number of communication rate information is at least two, screen, based on the card rate information, select communication rate information with a maximum rate value from respective communication rate information corresponding to which a rate value is not greater than a rate value corresponding to the communication rate information, and determine the selected communication rate information as the specific communication rate information.

In a possible implementation manner, the second processing unit 35 is configured to send a data transmission instruction carrying the data to be transmitted and the specified communication rate to the Bluetooth card reader and instruct the Bluetooth card reader to transmit the data to be transmitted based on the specified communication rate.

In the present application, through the cooperation of the CCID driver, the Bluetooth service program and the Bluetooth card reader, the effective selection of data transmission is realized, the application scenarios of data transmission are expanded, and the selection and development of data transmission are promoted.

Figure 4:
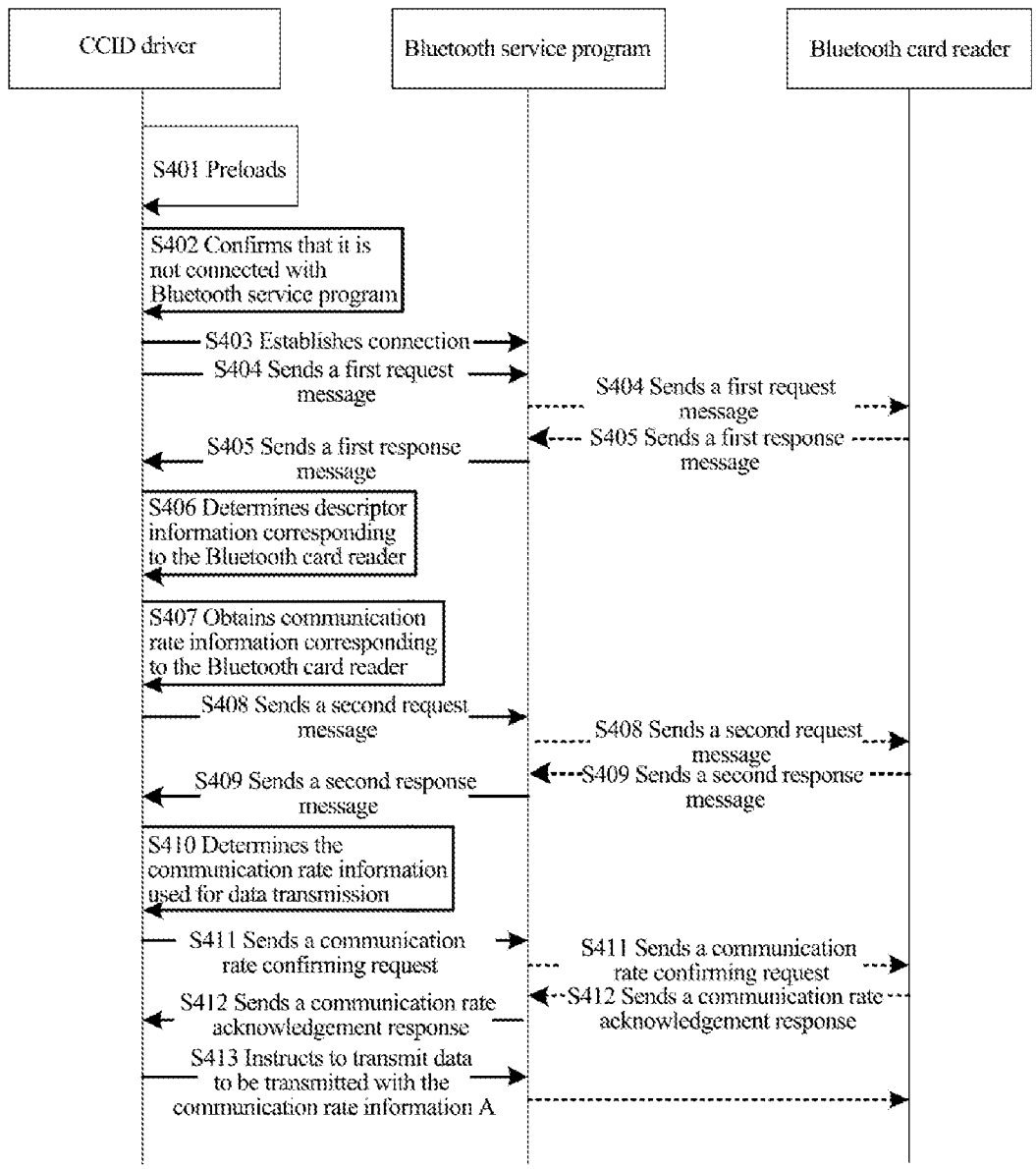
FIG. 4 is a flowchart of a specific example of a data transmission method for a Bluetooth card reader provided by the present application.

Based on the aforementioned technical solution provided by the present application, the technical solution will be explained in detail below with a specific embodiment, as shown in FIG. 4, in this specific embodiment, the system takes the MAC OS system as an example.

Step S401, the CCID driver on the MAC OS system preloads.

In an embodiment of the present application, the MAC OS system is powered on and activated and preloads the CCID driver after the activating; in this case, after the CCID driver is preloaded, the CCID driver has to keep its current background online state; in order to keep the current background online state, the CCID has to periodically push itself a fake notification message indicating that the Bluetooth card reader has activated; in fact, it may not be known at this time whether the Bluetooth card reader is activated. The above notification message defaults that the Bluetooth card reader has been activated.

Step S402, the CCID driver confirms that it is not connected with Bluetooth service program.

In an embodiment of the present application, under the premise that the aforementioned default Bluetooth card reader has been activated, the CCID driver needs to perform polling processing of the state of the card slot of the Bluetooth card reader. Before this, it is necessary to confirm whether the connection with the Bluetooth service program has been established. If the connection with the Bluetooth service program has been established, goes to Step S408; if the connection with the Bluetooth service program has not been established, goes to Step S403.

Step S403, the CCID driver establishes connection with the Bluetooth service program.

In an embodiment of the present application, the CCID driver attempts to establish connection the two with the Bluetooth service program and then determines whether the connection is established successfully, if establishment is successful, goes to Step S404, the CCID driver can perform processing of the type information of the Bluetooth card reader; if the establishment is failed, goes to Step S402, the CCID driver needs to return itself a message of "no card" in the card slot of the Bluetooth card reader, so as to continue to perform the polling processing.

Step S404, the CCID driver sends a first request message to the Bluetooth service program.

In an embodiment of the present application, the CCID driver sends a first request message for obtaining type information corresponding to a Bluetooth card reader to the Bluetooth service program; so as to request to obtain, according to the first request message the type information corresponding to the Bluetooth card reader, where the Bluetooth card reader connects to the Bluetooth service program via Bluetooth; the Bluetooth service program sends the corresponding request to the corresponding Bluetooth card reader according to the first request message, and the Bluetooth card reader provides its own corresponding type information.

In a possible implementation manner, before the Bluetooth service program sends a first request message, it is also necessary to confirm whether it has established a connection with the Bluetooth card reader; if the Bluetooth service program establishes the connection with the Bluetooth card reader successfully, goes to Step S405; if the Bluetooth service program establishes the connection with the Bluetooth card reader unsuccessfully, goes to Step S402.

Among them, the aforementioned connection established between the Bluetooth service program and the Bluetooth card reader can be Bluetooth connection. Specifically, the Bluetooth service program sends a Bluetooth connection establishment request to the Bluetooth card reader; after receiving the Bluetooth connection establishment request, the Bluetooth card reader returns a Bluetooth connection establishment response to the Bluetooth service program, thereby establishing a Bluetooth connection between the two.

Step S405, the CCID driver receives a first response message returned by the Bluetooth service program.

In an embodiment of the present application, after receiving the first request message sent by the Bluetooth service program, the Bluetooth card reader returns a first response message to the Bluetooth service program based on the request message; where the first response message carries type information corresponding to the Bluetooth card reader, then the Bluetooth service program forwards the first response message to the CCID driver.

Step S406, The CCID driver determines descriptor information corresponding to the Bluetooth card reader.

In an embodiment of the present application, the CCID driver queries its own database according to the type information corresponding to the Bluetooth card reader and finds the descriptor information of the Bluetooth card reader that matches the type information.

Step S407, the CCID driver obtains communication rate information corresponding to the Bluetooth card reader.

In an embodiment of the present application, the CCID driver obtains two communication rate information stored in the descriptor information by parsing the descriptor information, which are communication rate information A and communication rate information B.

Step S408, the CCID driver sends a second request message to the Bluetooth service program.

In an embodiment of the present application, the CCID driver sends a second request message for obtaining the state information of the card slot of the Bluetooth card reader to the Bluetooth service program, so as to obtain the state information of the card slot of the Bluetooth card reader according to the second request message; the Bluetooth service program sends a corresponding request to a corresponding Bluetooth card reader according to the second request message; the Bluetooth card reader provides its own corresponding state information.

Step S409, the CCID driver receives a second response message sent from the Bluetooth service program.

In an embodiment of the present application, after receiving the second request message sent by the Bluetooth service program, the Bluetooth card reader returns a second response message to the Bluetooth service program based on the request message, and the second response message carries the state information of the Bluetooth card reader and the card information of the card; where the state information indicates whether a card is inserted in the card slot of the Bluetooth card reader; the Bluetooth service program forwards the second response message to the CCID driver and the CCID driver obtains the state information and the card information included in the second response message, and the state information is "confirm that a card is inserted".

In a possible implementation manner, when the state information indicates that a card exists, goes to Step S410; when the state information indicates that a card does not exist, goes to Step S402.

Step S410, the CCID driver determines the communication rate information used for data transmission.

In an embodiment of the present application, after obtaining the card information of the card, the CCID driver screens the communication rate information A and the communication rate information B based on the card rate information carried in the card information and determines that the communication rate information A is required communication rate information.

Step S411, the CCID driver sends a communication rate confirming request to the Bluetooth card reader.

In an embodiment of the present application, the CCID driver carries the selected communication rate information A in the communication rate confirming request and sends the communication rate confirming request to the Bluetooth service program; the Bluetooth service program forwards the communication rate confirming request to the Bluetooth card reader for verification.

Step S412, the CCID driver receives a communication rate acknowledgement response returned by the Bluetooth card reader.

In an embodiment of the present application, if the Bluetooth card reader permits the CCID driver to perform data transmission using the communication rate information A after receiving the aforementioned communication rate confirmation request, then carries the confirming information of permission of using the communication rate information A in the communication rate acknowledgement response and sends the communication rate acknowledgement response to the Bluetooth service program, and the communication rate acknowledgement response is forwarded to the CCID driver via the Bluetooth service program.

Step S413, the CCID driver instructs the Bluetooth card reader to transmit data to be transmitted with the communication rate information A.

In an embodiment of the present application, after receiving an acknowledgement information from the Bluetooth card reader, the CCID driver carries the data to be transmitted and the determines communication rate information A in a data transmission instruction, forwards the data transmission instruction to the Bluetooth card reader via the Bluetooth service program; the Bluetooth card reader transmits the data to be transmitted with the communication rate information after receiving the data transmission instruction.

In the present application, through the cooperation of the CCID driver, the Bluetooth service program and the Bluetooth card reader, the effective selection of data transmission is realized, the application scenarios of data transmission are expanded, and the selection and development of data transmission are promoted.

Figure 5:
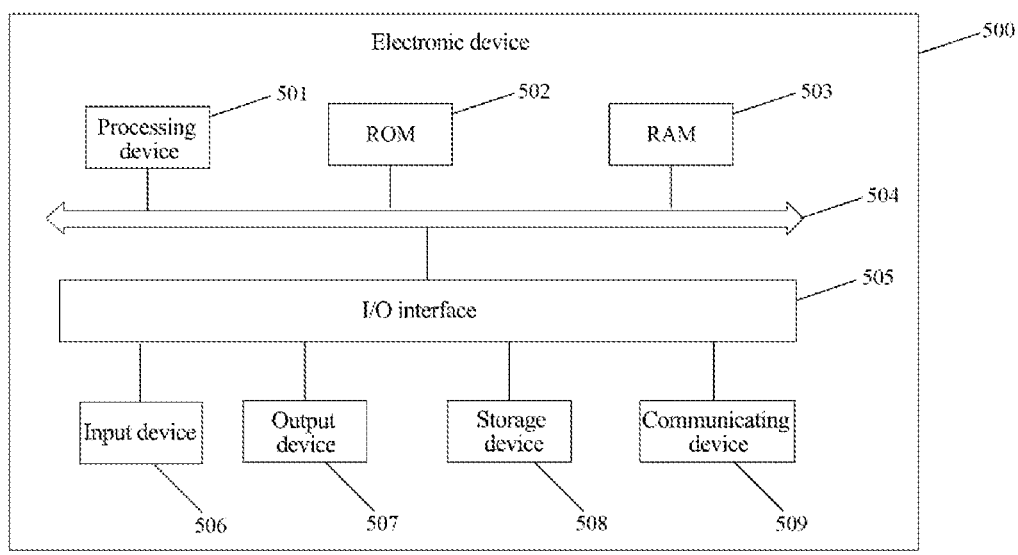
FIG. 5 is a structural diagram of an electronic device for a data transmission method for a Bluetooth card reader provided by the present application.

Referring to FIG. 5, it shows a structural diagram of an electronic device (for example, an entity device including the CCID driver shown in FIG. 1) 500 adapted to implement the embodiments of the present application. The terminal devices in an embodiments of the present application may include but are not limited to a mobile terminal such as a mobile phone, a notebook computer, a digital broadcast receiver, a Personal Digital Assistant (PDA), a tablet computer (PAD), a Portable Multimedia Player (PMP), a vehicle mounted terminal (i.e. a vehicle mounted navigation terminal), etc., and a fixed terminal such as a digital TV, a desktop computer, or the like. The electronic device shown in FIG.

5 is only an example, and should not bring any limitation to the function and scope of use of the embodiments of the present application.

As shown in FIG. 5, the electronic device 500 can include a processing device (for example, a central processing unit, a graphic processing unit, and the like) 501 which can execute proper operation and process according to the program stored in read only memory (ROM) 502, or the program loaded to random access memory (RAM) 503 from the storage device 508. Various programs and data required for the operation of the electronic device 500 is also stored in RAM 503. The processing device 501, the ROM 502 and the RAM 503 are connected to each other via a bus 504. An input/output (I/O) interface 505 is also connected to the bus 504.

Generally, the following devices can be connected to the I/O interface 505, which include the input device 506 such as touching screen, touching panel, keyboard, camera, microphone, accelerometer, gyroscope, and the like, and the output device 507 such as liquid crystal display (LCD), speaker, oscillator, and the like, the storage device 508 such as tape, hardware, and the like, and a communicating device 509. The communicating device 509 can permit the electronic device 500 to perform wireless and wire communication with other devices to exchange data. Although FIG. 5 presents an electronic device 500 having various devices. It should be understood that not all of the devices are required or implemented. Alternatively, more or less devices can be required or implemented.

In particular, according to the embodiments of the present application, the process described above with reference to the flowchart can be implemented as a computer software program. For example, the embodiment of the present application can include a computer program product, which includes a computer program carried on a computer-readable medium, and the computer program includes program code for executing the method shown in the flowchart. In such an embodiment, the computer program may be downloaded and installed from the network through the communication device 509, or installed from the storage device 508, or installed from the ROM 502. When the computer program is executed by the processing device 501, it executes the above-mentioned functions defined in the method of the embodiment of the present application.

It should be noted that the above-mentioned computer-readable medium in this application may be a computer-readable signal medium or a computer-readable storage medium, or any combination of the two. The computer-readable storage medium may be, for example, but not limited to, an electrical, magnetic, optical, electromagnetic, infrared, or semiconductor system, device, or device, or a combination of any of the above. More specific examples of computer-readable storage media may include, but are not limited to: electrical connections with one or more wires, portable computer disks, hard disks, random access memory (RAM), read-only memory (ROM), erasable Programmable read-only memory (EPROM or flash memory), optical fiber, portable compact disk read-only memory (CD-ROM), optical storage device, magnetic storage device, or any suitable combination of the above. In this application, the computer-readable storage medium may be any tangible medium that contains or stores a program, and the program may be used by or in combination with an instruction execution system, apparatus, or device. In this application, the computer-readable signal medium may include a data signal propagated in baseband or as a part of a carrier wave, and computer-readable program code is carried therein. This propagated data signal can take many forms, including but not limited to electromagnetic signals, optical signals, or any suitable combination of the foregoing. The computer-readable signal medium may also be any computer-readable medium other than the computer-readable storage medium. The computer-readable signal medium may send, propagate, or transmit the program for use by or in combination with the instruction execution system, apparatus, or device. The program code contained on the computer-readable medium can be transmitted by any suitable medium, including but not limited to: wire, optical cable, RF (Radio Frequency), etc., or any suitable combination of the above.

The above-mentioned computer-readable medium may be included in the above-mentioned electronic device; or it may exist alone without being assembled into the electronic device.

The above-mentioned computer-readable medium carries one or more programs. When the above-mentioned one or more programs are executed by the electronic device, the electronic device: obtains at least two Internet protocol addresses; anode evaluation request for an Internet Protocol address, wherein the node evaluation device selects an Internet Protocol address from the at least two Internet Protocol addresses and returns it; receives the Internet Protocol address returned by the node evaluation device; wherein, the obtained The Internet Protocol address indicates the edge node in the content distribution network.

Alternatively, the aforementioned computer-readable medium carries one or more programs, and when the aforementioned one or more programs are executed by the electronic device, the electronic device: receives a node evaluation request including at least two Internet Protocol addresses; Among the at least two Internet Protocol addresses, an Internet Protocol address is selected; the selected Internet Protocol address is returned; wherein the received Internet Protocol address indicates an edge node in the content distribution network.

The computer program code used to perform the operations of this application can be written in one or more programming languages or a combination thereof. The above-mentioned programming languages include object-oriented programming languages—such as Java, Smalltalk, C++, and also conventional Procedural programming language—such as "C" language or similar programming language. The program code can be executed entirely on the user's computer, partly on the user's computer, executed as an independent software package, partly on the user's computer and partly executed on a remote computer, or entirely executed on the remote computer or server. In the case of a remote computer, the remote computer can be connected to the user's computer through any kind of network, including a local area network (LAN) or a wide area network (WAN), or it can be connected to an external computer (for example, using an Internet service provider to pass Internet connection).

The flowcharts and block diagrams in the accompanying drawings illustrate the possible implementation of the system architecture, functions, and operations of the system, method, and computer program product according to various embodiments of the present application. In this regard, each block in the flowchart or block diagram may represent a module, program segment, or part of code, and the module, program segment, or part of code contains one or more for realizing the specified logic function. Executable instructions. It should also be noted that, in some alternative implementations, the functions marked in the block may also occur in a different order from the order marked in the drawings. For example, two blocks shown in succession can actually be executed substantially in parallel, and they can sometimes be executed in the reverse order, depending on the functions involved. It should also be noted that each block in the block diagram and/or flowchart, and the combination of the blocks in the block diagram and/or flowchart, can be implemented by a dedicated hardware-based system that performs the specified functions or operations or it can be realized by a combination of dedicated hardware and computer instructions.

The units involved in the embodiments described in this application can be implemented in software or hardware. Wherein, the name of the unit does not constitute a limitation on the unit itself under certain circumstances. For example, the first obtaining unit can also be described as "a unit for obtaining at least two Internet Protocol addresses".

The above description is only a preferred embodiment of the present application and an explanation of the applied technical principles. Those skilled in the art should understand that the scope of disclosure involved in this application is not limited to the technical solutions formed by the specific combination of the above technical features, and should also cover the above technical features or technical solutions without departing from the above disclosed concept. Other technical solutions formed by arbitrarily combining the equivalent features. For example, the above-mentioned features and the technical features disclosed in this application (but not limited to) with similar functions are mutually replaced to form a technical solution.

The electronic device provided in this application is applicable to any embodiment of the aforementioned data transmission method, and will not be repeated here.

In the present application, through the cooperation of the CCID driver, the Bluetooth service program and the Bluetooth card reader, the effective selection of data transmission is realized, the application scenarios of data transmission are expanded, and the selection and development of data transmission are promoted The present application provides a computer-readable storage medium that stores computer instructions, and the computer instructions cause a computer to execute the data transmission method shown in the above-mentioned embodiments.

The computer-readable storage medium provided in this application is applicable to any embodiment of the aforementioned data transmission method, and will not be repeated here.

In the present application, through the cooperation of the CCID driver, the Bluetooth service program and the Bluetooth card reader, the effective selection of data transmission is realized, the application scenarios of data transmission are expanded, and the selection and development of data transmission are promoted.

Those skilled in the art can understand that computer program instructions can be used to implement each block in these structural diagrams and/or block diagrams and/or flow diagrams and combinations of blocks in these structural diagrams and/or block diagrams and/or flow diagrams. Those skilled in the art can understand that these computer program instructions can be provided to processors of general-purpose computers, professional computers, or other programmable data processing methods for implementation, so that the computer or other programmable data processing method processors can execute this The structure diagram and/or block diagram and/or flow diagram disclosed in the application or the schemes specified in multiple boxes.

Among them, the various modules of the device of the present application can be integrated or deployed separately. The above-mentioned modules can be combined into one module or further divided into multiple sub-modules.

Those skilled in the art can understand that the accompanying drawings are only schematic diagrams of a preferred embodiment, and the modules or processes in the accompanying drawings are not necessarily necessary for implementing this application.

Those skilled in the art can understand that the modules in the device in the embodiment can be distributed in the device in the embodiment according to the description of the embodiment, or can be changed to be located in one or more devices different from this embodiment. The modules in the above-mentioned embodiments can be combined into one module or further divided into multiple sub-modules.

The above serial number of this application is for description only, and does not represent the advantages and disadvantages of the embodiments.

The above disclosures are only a few specific embodiments of the application, but the application is not limited to them, and any changes that can be thought of by those skilled in the art should fall into the protection scope of the application.

What is claimed is:

1. A data transmission method, comprising the following steps:
    sending, by a chip/smart card interface device (CCID) driver, a first request message for obtaining type information corresponding to a Bluetooth card reader to a Bluetooth service program;
    receiving, by the CCID driver, a first response message returned by the Bluetooth service program;
    in a case that the first response message carries the type information corresponding to the Bluetooth card reader, determining, by the CCID driver, communication rate information corresponding to the Bluetooth card reader based on the type information corresponding to the Bluetooth card reader;
    obtaining, by the CCID driver, state information of a card slot of the Bluetooth card reader, wherein the state information carries card information of a card inserted in the card slot of the Bluetooth card reader;
    determining, by the CCID driver, specific communication rate information for data transmission based on the card information and the communication rate information;
    carrying, by the CCID driver, the specific communication rate information in a communication rate confirming request and forwarding, via the Bluetooth service program, the communication rate confirming request to the Bluetooth card reader for verification, wherein the Bluetooth card reader is connected with the Bluetooth service program via Bluetooth; and
    instructing, by the CCID driver, based on a communication rate acknowledgement response returned by the Bluetooth card reader, the Bluetooth card reader to transmit, with the specific communication rate information confirmed through the communication rate acknowledgement response, data to be transmitted.

2. The method of claim 1, wherein before the sending, by the CCID driver, the first request message for obtaining type information corresponding to the Bluetooth card reader to the Bluetooth service program, the method further comprises:
    confirming, by the CCID driver, whether a connection with the Bluetooth service program has been established; and if no, establishing, by the CCID driver, the connection with the Bluetooth service program, and sending the first request message to the Bluetooth service program after the connection has been established.

3. The method of claim 2, wherein the determining, by the CCID driver, the communication rate information corresponding to the Bluetooth card reader based on the type information corresponding to the Bluetooth card reader comprises:
querying, by the CCID driver, based on the type information corresponding to the Bluetooth card reader, and determining, descriptor information corresponding to the type of the Bluetooth card reader; and
obtaining, by the CCID driver, the communication rate information corresponding to the Bluetooth card reader based on the descriptor information.

4. The method of claim 3, wherein the obtaining, by the CCID driver, the state information of the card slot of the Bluetooth card reader comprises:
sending, by the CCID driver, a second request message for obtaining the state information of the card slot of the Bluetooth card reader to the Bluetooth service program; and
receiving, by the CCID driver, a second response message sent from the Bluetooth service program, wherein the second response message carries the state information indicating that a card is in the card slot of the Bluetooth card reader and the card information corresponding to the card.

5. The method of claim 4, wherein the determining, by the CCID driver, the specific communication rate information for data transmission based on the card information and the communication rate information comprises:
obtaining, by the CCID driver, card rate information corresponding to the card carried in the card information; and
when the number of the communication rate information is at least two, screening, by the CCID driver, based on the card rate information, selecting communication rate information with a maximum rate value from respective communication rate information corresponding to which a rate value is not greater than a rate value corresponding to the communication rate information, and determining the selected communication rate information as the specific communication rate information.

6. The method of claim 5, wherein the instructing, by the CCID driver, based on the communication rate acknowledgement response returned by the Bluetooth card reader, the Bluetooth card reader to transmit, with the specific communication rate information confirmed through the communication rate acknowledgement response, the data to be transmitted comprises:
sending, by the CCID driver, a data transmission instruction carrying the data to be transmitted and the specified communication rate to the Bluetooth card reader and instructing the Bluetooth card reader to transmit the data to be transmitted based on the specified communication rate.

7. An electronic device comprising a chip/smart card interface device (CCID) driver, comprising a processor and a memory;
the memory is configured to store operation instructions;
the processor is configured to call the operation instructions to execute steps of:
sending a first request message for obtaining type information corresponding to a Bluetooth card reader to a Bluetooth service program;
receiving a first response message returned by the Bluetooth service program;
in a case that the first response message carries the type information corresponding to the Bluetooth card reader, determining communication rate information corresponding to the Bluetooth card reader based on the type information corresponding to the Bluetooth card reader;
obtaining state information of a card slot of the Bluetooth card reader, wherein the state information carries card information of a card inserted in the card slot of the Bluetooth card reader;
determining specific communication rate information for data transmission based on the card information and the communication rate information;
carrying the specific communication rate information in a communication rate confirming request and forwarding, via the Bluetooth service program, the communication rate confirming request to the Bluetooth card reader for verification, wherein the Bluetooth card reader is connected with the Bluetooth service program via Bluetooth; and
instructing based on a communication rate acknowledgement response returned by the Bluetooth card reader, the Bluetooth card reader to transmit, with the specific communication rate information confirmed through the communication rate acknowledgement response, data to be transmitted.

8. The electronic device of claim 7, wherein the processor is further configured to call the operation instructions to execute steps of:
confirming whether a connection with the Bluetooth service program has been established; and
if no, establishing the connection with the Bluetooth service program, and sending the first request message to the Bluetooth service program after the connection has been established.

9. The electronic device of claim 8, wherein the processor is further configured to call the operation instructions to execute steps of:
querying based on the type information corresponding to the Bluetooth card reader, and determining, descriptor information corresponding to the type of the Bluetooth card reader; and
obtaining the communication rate information corresponding to the Bluetooth card reader based on the descriptor information.

10. The electronic device of claim 9, wherein the processor is further configured to call the operation instructions to execute steps of:
sending a second request message for obtaining the state information of the card slot of the Bluetooth card reader to the Bluetooth service program; and
receiving a second response message sent from the Bluetooth service program, wherein the second response message carries the state information indicating that a card is in the card slot of the Bluetooth card reader and the card information corresponding to the card.

11. The electronic device of claim 10, wherein the processor is further configured to call the operation instructions to execute steps of:
obtaining card rate information corresponding to the card carried in the card information; and
when the number of the communication rate information is at least two, screening based on the card rate information, selecting communication rate information with a maximum rate value from respective communication rate information corresponding to which a rate value is not greater than a rate value corresponding to the communication rate information, and determining the selected communication rate information as the specific communication rate information.

12. The electronic device of claim 11, wherein the processor is further configured to call the operation instructions to execute step of:

sending a data transmission instruction carrying the data to be transmitted and the specified communication rate to the Bluetooth card reader and instructing the Bluetooth card reader to transmit the data to be transmitted based on the specified communication rate.

* * * * *